(12) United States Patent
Haas et al.

(10) Patent No.: US 7,772,312 B2
(45) Date of Patent: Aug. 10, 2010

(54) REINFORCED POLYURETHANE-UREA ELASTOMERS AND THEIR USE

(75) Inventors: Peter Haas, Haan (DE); Hans-Detlef Arntz, Lohmar (DE)

(73) Assignee: Bayer MaterialScience AG, Leverkusen (DE)

( * ) Notice: Subject to any disclaimer, the term of this patent is extended or adjusted under 35 U.S.C. 154(b) by 590 days.

(21) Appl. No.: 11/311,056

(22) Filed: Dec. 19, 2005

(65) Prior Publication Data

US 2006/0142462 A1 Jun. 29, 2006

(30) Foreign Application Priority Data

Dec. 24, 2004 (DE) .................... 10 2004 062 539

(51) Int. Cl.
*C08K 3/34* (2006.01)
*C08K 7/10* (2006.01)
*C08G 18/10* (2006.01)
*C08G 18/50* (2006.01)
*C08G 18/78* (2006.01)
*C08G 18/12* (2006.01)

(52) U.S. Cl. .................... 524/445; 524/589; 528/77; 264/255; 264/328.2; 521/116; 521/125; 521/129; 521/167; 521/176

(58) Field of Classification Search ................ 524/589, 524/445

See application file for complete search history.

(56) References Cited

U.S. PATENT DOCUMENTS

| 4,585,829 | A | * | 4/1986 | Kuo et al. | .................. 524/714 |
| 5,418,260 | A | | 5/1995 | Smith | .......................... 521/159 |
| 5,498,911 | A | | 3/1996 | Bossler et al. | ................ 528/77 |
| 5,504,179 | A | | 4/1996 | Meiners et al. | ............... 528/49 |
| 5,723,194 | A | * | 3/1998 | Rosthauser et al. | ........... 428/95 |
| 6,471,905 | B1 | * | 10/2002 | Haas et al. | ............. 264/331.19 |
| 2003/0204016 | A1 | * | 10/2003 | Arntz et al. | .................. 524/589 |
| 2004/0127591 | A1 | * | 7/2004 | Haas et al. | .................. 521/170 |
| 2005/0062203 | A1 | * | 3/2005 | Haas et al. | .................. 264/338 |
| 2006/0189780 | A1 | * | 8/2006 | Haas et al. | .................... 528/44 |

FOREIGN PATENT DOCUMENTS

| EP | 1 004 606 A1 | 5/2000 |
| EP | 1 369 444 A1 | 12/2003 |

* cited by examiner

*Primary Examiner*—Marc S Zimmer
*Assistant Examiner*—Noah Frank
(74) *Attorney, Agent, or Firm*—Lyndanne M. Whalen; Noland J. Cheung; John E. Mrozinski, Jr.

(57) ABSTRACT

The invention relates to reinforced polyurethane-urea elastomers with a specific urea content and a specific urethane content, to sheet polyurethane moldings with high surface energy and good lacquer adhesion produced therefrom, and to their use.

12 Claims, No Drawings

REINFORCED POLYURETHANE-UREA ELASTOMERS AND THEIR USE

FIELD OF THE INVENTION

The invention relates to reinforced polyurethane-urea elastomers with a specific urea content and a specific urethane content, to sheet polyurethane moldings with high surface energy and good lacquer adhesion produced therefrom, and to their use.

BACKGROUND OF THE INVENTION

The preparation of polyurethane-urea elastomers by reacting NCO semiprepolymers with mixtures of aromatic diamines and higher-molecular compounds containing hydroxyl or amino groups is known and is described e.g. in U.S. Pat. No. 5,418,260 and EP-A 656 380. To achieve specific mechanical properties in the moldings produced therefrom, it is necessary to add reinforcing agents to the reactants, especially in order to improve thermomechanical properties and substantially increase the flexural modulus. For such reinforced polyurethane-urea elastomers, which are used for the production of sheet moldings such as car wings, doors, rear flaps and sills, it is desirable for these parts to be easily releasable from the moulds in order to ensure the shortest possible cycle times by means of a quick-release system.

However, quick-release systems have the disadvantage of a low surface tension due to the release agents. The surface tensions here are only 34 mN/m, but a good lacquer adhesion requires surface tensions of 40-42 mN/m. Values around 42 mN/m may only be achieved by additional cleaning processes.

SUMMARY OF THE INVENTION

The present invention provides reinforced polyurethane-urea elastomers which have good thermomechanical properties, good release properties and at the same time high surface tensions so that the moldings produced from said elastomers can be lacquered easily.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, OH numbers, functionalities and so forth in the specification are to be understood as being modified in all instances by the term "about." Equivalent weights and molecular weights given herein in Daltons (Da) are number average equivalent weights and number average molecular weights respectively, unless indicated otherwise.

It has now been found, surprisingly, that specific polyurethane-urea elastomers containing reinforcing agents assure problem-free processing as regards the production of sheet moldings with a defect-free surface and good mould release behavior, coupled with the high surface tension that is required for a good lacquer adhesion.

The present invention provides polyurethane-urea elastomers containing reinforcing agents and having a urea content ranging from 70 to 95 mol % and a urethane content ranging from 5 to 30 mol %, based on mol % of an NCO equivalent, said elastomers being obtainable by reacting a reaction mixture of a component A containing A1) one or more aromatic diamines having an alkyl substituent in at least one ortho position to the amino groups,
A2) an aliphatic reactant containing at least one polyetherpolyol of molecular weight 500 to 18,000 having hydroxyl and/or primary amino groups,
A3) optionally aliphatic amines,
A4) reinforcing agents,
A5) optionally catalysts and/or additives, and
A6) at least one metal salt chosen from compounds containing
  i) the metals Li, Mg, Ca, Ba, Zn, Cu, Fe, Co and Ni, and
  ii) carboxylic acids having 8 to 40 C atoms, phosphorus-containing acids having 8 to 40 C atoms or sulfur-containing acids having 8 to 40 C atoms, with a prepolymer component B produced from
B1) a polyisocyanate component containing a liquefied polyisocyanate or polyisocyanate mixture of the diphenylmethane series, and
B2) a polyol component of average molecular weight 500 to 18,000 containing at least one polyetherpolyol optionally containing organic fillers, wherein components A2) and B2) have a functionality of 2 to 8, an ethylene oxide content of 40-100 wt. % and an alkyloxirane content of 0-60 wt. %, component A and component B are reacted in stoichiometric proportions such that the isocyanate index of the elastomer obtained ranges from 80 to 120 and the polyol component B2) introduced via the component B is 10 to 90 mol % of the urethane content.

The salts A6) can optionally be used as a solution in the component A3).

Preferred reinforced polyurethane-urea elastomers are those with a urea content of from 75 to 95 mol % and a urethane content of from 5 to 25 mol %, based on mol % of an NCO equivalent.

The invention also provides polyurethane parts made of the polyurethane-urea elastomers according to the invention.

Examples of the component A6) which may be mentioned are zinc stearate, zinc palmitate, zinc laurate, zinc dioctylphosphate, zinc didecylphosphate, magnesium stearate and magnesium dioctylphosphate.

Particularly preferably, component A and component B are reacted in proportions such that the isocyanate index of the elastomer obtained ranges from 90 to 115 and the polyol component B2) introduced via the component B is from 30 to 85% of the urethane content.

Very good release properties and a high surface tension of over 40 mN/m, as required for a good lacquer adhesion, are obtained for the polyurethane-urea elastomers according to the invention by using components A2) and B2) with an ethylene oxide content of 40-100 wt. %, preferably of 50-90 wt. %, and 0-60 wt. %, particularly preferably 10-50 wt. %, of an alkyloxirane, e.g. propylene oxide (methyloxirane), ethyloxirane, propyloxirane or butyloxirane, and the metal salts A6).

Surface energies or surface tensions in this order of magnitude are not achieved in elastomers that contain A6) and are based on the components A2) and B2) with an alkyloxirane content of 60 to 100 wt. %, the actual values being only 35 mN/m. Elastomers with surface tension values of about 40 mN/m may only obtained by means of expensive washing processes.

The reinforcing agents A4) used are preferably those which are of an inorganic nature and have a laminar and/or acicular structure. In particular they are silicates of main groups II and III of the periodic table, such as calcium silicate of the wollastonite type and aluminum silicates of the mica or kaolin type. Such silicate-based reinforcing agents are known as sorosilicates, cyclosilicates, inosilicates or phyllosilicates and are described e.g. in Hollemann-Wiberg, W. de Gruyter Verlag (1985), 768 to 778.

These reinforcing agents have a diameter or a plate height or thickness of 2 to 30 μm and a linear dimension of 10 to 600 μm and their length/diameter ratio ranges preferably from 5:1 to 35:1, more preferably from 7:1 to 30:1. The diameter of spherical parts is preferably 5 to 150, more preferably 20 to 100 μm.

The reinforcing agents are preferably added in amounts of 10 to 35 wt. %, more preferably of 10 to 30 wt. %, based on the total amount of components A and B.

The component A1) can contain aromatic diamines which have an alkyl substituent in at least one ortho position to the amino groups, and a molecular weight of 122 to 400. Particularly preferred aromatic diamines are those which have at least one alkyl substituent in the ortho position to the first amino group and two alkyl substituents in the ortho position to the second amino group, said alkyl substituents each preferably having 1 to 4 carbon atoms, more preferably 1 to 3 carbon atoms. Very particularly preferred aromatic diamines are those which have an ethyl, n-propyl and/or isopropyl substituent in at least one ortho position to the amino groups and optionally methyl substituents in other ortho positions to the amino groups. Examples of such diamines are 2,4-diaminomesitylene, 1,3,5-triethyl-2,4-diaminobenzene and its technical-grade mixtures with 1-methyl-3,5-diethyl-2,6-diaminobenzene, or 3,5,3',5'-tetraisopropyl-4,4'- diaminodiphenylmethane. Of course, mixtures with one another can also be used. Particularly preferably, the component A1) is 1-methyl-3,5-diethyl-2,4-diamino-benzene or its technical-grade mixtures with 1-methyl-3,5-diethyl-2,6-diamino-benzene (DETDA).

The component A2) contains at least one aliphatically bonded polyetherpolyol preferably of molecular weight 500 to 18,000, more preferably 1,000 to 16,000 and most preferably 1,500 to 15,000, having hydroxyl and/or primary amino groups. The component A2) possesses the aforementioned functionalities. The polyetherpolyols can be prepared in a known manner known by the alkoxylation of starter molecules or their mixtures of corresponding functionality, the alkoxylation being carried out using especially ethylene oxide and to a lesser extent alkyloxiranes like propylene oxide. Suitable starters or starter mixtures include sucrose, sorbitol, pentaerythritol, glycerol, trimethylenepropane, propylene glycol and water. Preferred polyetherpolyols are those in which at least 50%, more preferably at least 70% and especially all of the hydroxyl groups are primary hydroxyl groups. Other possible polyetherpolyols here are those which optionally contain organic fillers in dispersed form. Examples of these dispersed fillers are vinyl polymers, such as those formed by the polymerization of acrylonitrile and styrene in polyetherpolyols as reaction medium (U.S. Pat. Nos. 3,383,351, 3,304,273, 3,523,093, 3,110,695, DE-PS 11 52 536), or polyureas or polyhydrazides, such as those formed by a polyaddition reaction between organic diisocyanates and diamines or hydrazine in polyetherpolyols as reaction medium (DE-PS 12 60 142, DE-OS 24 23 984, 25 19 004, 25 13 815, 25 50 833, 25 50 862, 26 33 293 or 25 50 796).

Such polyethers are described e.g. in Kunststoffhandbuch 7, Becker/Braun, Carl Hanser Verlag, 3rd edition, 1993.

Polyetherpolyols having primary amino groups, such as those described e.g. in EP-A 219 035 and known as ATPE (amino-terminated polyethers), can also be used as the component A2).

The so-called JEFFAMINES from Texaco, composed of α,ω-diaminopolypropylene glycols, are particularly suitable as the component A3).

The known catalysts for the urethane and urea reaction, such as tertiary amines or the tin(II) or tin(IV) salts of higher carboxylic acids, can be used as the component A5). Other additives used are stabilizers, such as the known polyethersiloxanes or mould release agents. The known catalysts or additives are described e.g. in chapter 3.4 of Kunststoffhandbuch 7, Polyurethane, Carl Hanser Verlag (1993), pp 95 to 119, and can be used in the conventional amounts.

The so-called component B is an NCO prepolymer based on the polyisocyanate component B1) and the polyol component B2) and preferably has an NCO content of from 8 to 26 wt. %, more preferably from 12 to 25 wt. %.

The polyisocyanates B1) are polyisocyanates or polyisocyanate mixtures of the diphenylmethane series, optionally liquefied by chemical modification. By the expression "polyisocyanate of the diphenylmethane series" is meant all polyisocyanates formed in the phosgenation of aniline/formaldehyde condensation products and present as individual components in the phosgenation products. The expression "polyisocyanate mixture of the diphenylmethane series" denotes any mixtures of polyisocyanates of the diphenylmethane series, for example said phosgenation products, the mixtures obtained as distillate or distillation residue in the distillative separation of such mixtures, and any mixtures of polyisocyanates of the diphenylmethane series.

Examples of suitable polyisocyanates B1) are 4,4'-diisocyanatodiphenylmethane, its mixtures with 2,2'- and especially 2,4'-diisocyanatodiphenylmethane, mixtures of these diisocyanatodiphenylmethane isomers with their higher homologues, such as those obtained in the phosgenation of aniline/formaldehyde condensation products, diisocyanates and/or polyisocyanates modified by partial carbodiimidization of the isocyanate groups of said diisocyanates and/or polyisocyanates, or any mixtures of such polyisocyanates.

Compounds that are particularly suitable as the component B2) are the polyetherpolyols corresponding to this definition, or mixtures of such polyhydroxyl compounds. Possible examples are corresponding polyetherpolyols optionally containing organic fillers in dispersed form. Examples of these dispersed fillers are vinyl polymers, such as those formed e.g. by the polymerization of acrylonitrile and styrene in polyetherpolyols as reaction medium (U.S. Pat. Nos. 3,383,351, 3,304,273, 3,523,093, 3,110,695, DE-PS 11 52 536), or polyureas or polyhydrazides, such as those formed by a polyaddition reaction between organic diisocyanates and diamines or hydrazine in polyetherpolyols as reaction medium (DE-PS 12 60 142, DE-OS 24 23 984, 25 19 004, 25 13 815, 25 50 833, 25 50 862, 26 33 293 or 25 50 796). In principle, polyetherpolyols of the type already mentioned under A2) above are suitable as component B2) provided they correspond to the characteristics mentioned below.

The polyol component B2) has an average molecular weight preferably of 100 to 16,000, more preferably of 2,000 to 16,000, coupled with an average hydroxyl functionality of from 2 to 8, more preferably from 3 to 7.

The NCO semi-prepolymers B) are preferably prepared by reacting the components B1) and B2) in proportions (NCO in excess) such that the resulting NCO semi-prepolymers have the NCO content mentioned above. The appropriate reaction is generally carried out within the temperature range from 25 to 100° C. In the preparation of the NCO semi-prepolymers it is preferable to react the total amount of the polyisocyanate component B1) with the total amount of the component B2) intended for the preparation of the NCO semi-prepolymers.

The elastomers according to the invention are produced by the known reaction injection moldings technique (RIM process), as described e.g. in DE-AS 2 622 951 (U.S. Pat. No. 4,218,543) or DE-OS 39 14 718, the proportions of the components A) and B) corresponding to the stoichiometric proportions with an NCO index of 80 to 120. Also, the amount of reaction mixture introduced into the mould is measured so that the moldings have a density of at least 0.8, preferably of 1.0 to 1.4 g/cm$^3$. The density of the resulting moldings is of course largely dependent on the type and proportion by weight of the fillers used. In general, the moldings according to the invention are microcellular elastomers, i.e. not true foams having a foam structure visible to the naked eye. This means that any organic blowing agents used perform the function of a flow control agent rather than that of a true blowing agent.

The starting temperature of the reaction mixture of the components A) and B) introduced into the mold is preferably 20 to 80, more preferably 30 to 70° C. The temperature of the mold is preferably 30 to 130, more preferably 40 to 80° C. The molds used are those of the type known in the art, preferably made of aluminum or steel, or epoxy molds spray-coated with metal. The demolding properties can optionally be improved by coating the internal walls of the mold used with known external mold release agents.

The moldings formed in the mold can generally be released after a mold residence time of 5 to 180 seconds. The demolding is optionally followed by after-baking at a temperature of approx. 60 to 180° C. for a period of 30 to 120 minutes.

The reinforced polyurethane-urea elastomers according to the invention are used to produce moldings in processes known in the art.

The moldings obtained, preferably sheet moldings, are particularly suitable for the production especially of lacquered components in the vehicle sector, e.g. flexible car mud flaps or flexible body elements such as car doors and rear flaps or wings.

The invention will be illustrated in greater detail by means of the Examples which follow.

EXAMPLES

Starting Materials

Semi-prepolymer 1—1121 parts by weight of 4,4'-diisocyanatodiphenylmethane were reacted at 90° C. with 779 parts by weight of polyetherpolyol 1 of functionality 3. NCO content after 2 hours: 18.0%

Semiprepolymer 2—96.6 parts by weight of 4,4'-diisocyanatodiphenylmethane were reacted at 90° C. with 73.4 parts by weight of polyetherpolyol 2 of functionality 6. NCO content after 2 hours: 18.1%

Polyol 1—Polyetherpolyol of OH number 37, prepared by the alkoxylation of the starter glycerol with ethylene oxide and propylene oxide in respective proportions of 72 wt. % and 18 wt. %, having predominantly primary OH groups.

Polyol 2—Polyetherpolyol of OH number 28, prepared by the propoxylation of the hexafunctional starter sorbitol with propylene oxide, followed by ethoxylation in proportions of 83:17, having predominantly primary OH groups.

DETDA—Mixture of 80 wt. % of 1-methyl-3,5-diethyl-2, 4-diaminobenzene and 20 wt. % of 1-methyl-3,5-diethyl-2, 6-diaminobenzene DABCO 33 LV—Solution of 1,4-diazabicyclo[2.2.2]octane in dipropylene glycol (Air Products)

Jeffamine D400—Polyoxypropylenediamine (Texaco)

DBTDL—Dibutyltin dilaurate

Wollastonite—Tremin 939-955 from Quarzwerke, Frechen

The formulations described below were processed by the reaction injection molding technique. After intimate mixing in a mixing head with forced control, components A and B were injected from a high-pressure metering device via a sprue with restrictor bar into a heated platen mold of dimensions 300×200×3 mm at a mold temperature of 60° C.

The temperature of component A was 60° C. and the temperature of component B was 50° C.

The mechanical values were measured following afterbaking in a re-circulating air dryer (45 min at 160° C.) and then storage (24 hours).

Before each run the mold was treated with the mold release agent RTWC 2006 from Chem Trend.

The amounts shown in the Table are in parts by weight.

TABLE 1

|  | Ex. 1 | Ex. 2 | Ex. 3 | Ex. 4 (Comparative) |
| --- | --- | --- | --- | --- |
| Polyol 1 | 52.5 | 59.5 | 58 | — |
| Polyol 2 | — | — | — | 52.5 |
| DETDA | 42 | 35 | 35 | 42 |
| Zn stearate | 2 | 2 | 3.5 | 2 |
| JEFFAMINE D400 | 3 | 3 | 3 | 3 |
| DABCO 33 LV | 0.3 | 0.3 | 0.3 | 0.3 |
| DBTDL | 0.2 | 0.2 | 0.2 | 0.2 |
| Wollastonite | 57.1 | 52.5 | 52.5 | 56.6 |
| Semiprepolymer 1 | 128.4 | 110.3 | 110.1 | — |
| Semiprepolymer 2 | — | — | — | 126.4 |
| Wollastonite in elastomer [wt. %] | 20 | 20 | 20 | 20 |
| Index | 105 | 105 | 105 | 105 |
| Surface tension of boards stored at RT [mN/m][1] | 34 | 34 | 34 | 34 |
| Surface tension following after-baking for 45 min at 160° C. [mN/m][1] | 42 | 44 | 44 | <34 |

[1]The surface energy was measured by the method of Softal Electronic GmbH, D-21107 Hamburg, using the 34/56 Softal test ink process.

The elastomers from formulations 1 to 4 exhibited a good release behavior (more than 30 moldings can be released easily from the mold).

Following after-baking, the elastomers from formulations 1 to 3 have a surface tension of over 40 mN/m. In contrast, the elastomer molding from Comparative example 4 had a surface tension value of 34 mN/m. After-baking can reduce the value even further. Moldings with surface tensions of just over 40 mN/m may only obtained after expensive cleaning processes. In Examples 1 to 3 according to the invention, values of 56 mN/m were obtained after corresponding surface cleaning processes.

A good lacquer adhesion demands a surface tension of at least 42 mN/m. In Examples 1 to 3 according to the invention, this value was achieved without cleaning processes.

The following lacquering was carried out by the conventional processes with the coats being built up in the conventional order: primer, filler, lacquer coat(s) and topcoat enamel, as is conventional in lacquering technology. As regards its heat stability, the polyurethane-urea elastomer according to the invention is also particularly suitable for resisting the temperature stress during the curing of the applied stoving lacquers and withstanding it without damage.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A reinforced polyurethane-urea elastomer having a urea content ranging from about 70 to about 95 mol % and a urethane content ranging from about 5 to about 30 mol %, based on mol % of an NCO equivalent, the elastomers produced by reacting:
   a reaction mixture of a component A containing
   A1) one or more aromatic diamines having an alkyl substituent in at least one ortho position to the amino groups,
   A2) an aliphatic reactant containing at least one polyetherpolyol having a molecular weight of from about 500 to about 18,000 and having hydroxyl and/or primary amino groups,
   A3) optionally aliphatic amines,
   A4) one or more reinforcing agents,
   A5) optionally at least one of catalysts and additives, and
   A6) at least one metal salt chosen from compounds produced from
      i) the metals Li, Mg, Ca, Ba, Zn, Cu, Fe, Co and Ni, and
      ii) carboxylic acids having 8 to 40 C atoms, phosphorus-containing acids having 8 to 40 C atoms or sulfur-containing acids having 8 to 40 C atoms,
   with a prepolymer component B produced from
   B1) a polyisocyanate component consisting of a liquefied polyisocyanate or polyisocyanate mixture of the diphenylmethane series, and
   B2) a polyol component having an average molecular weight of from about 500 to about 18,000 containing at least one polyetherpolyol optionally containing organic fillers,
   wherein components A2) and B2) each independently have a functionality of 2 to 8, an ethylene oxide content of 40-100 wt. % and an alkyloxirane content of 0-60 wt. %, component A and component B reacted in stoichiometric proportions such that the isocyanate index of the elastomer ranges from about 80 to about 120 and wherein polyol component B2) introduced via component B comprises from about 10 to about 90 mol % of the urethane content.

2. A polyurethane molding made from the reinforced polyurethane-urea elastomers according to claim 1.

3. In a process for the production of a lacquered component for the vehicle industry, the improvement comprising including the polyurethane molding according to claim 2.

4. The process according to claim 3, wherein the lacquered component is chosen from flexible car mud flaps, car doors, car rear flaps and car wings.

5. The reinforced polyurethane-urea elastomer according to claim 1, wherein the elastomer has an after-baking surface tension of greater than about 40 mN/m.

6. A process for producing a reinforced polyurethane-urea elastomer having a urea content ranging from about 70 to about 95 mol % and a urethane content ranging from about 5 to about 30 mol %, based on mol % of an NCO equivalent, comprising reacting:
   a reaction mixture of a component A containing
   A1) one or more aromatic diamines having an alkyl substituent in at least one ortho position to the amino groups,
   A2) an aliphatic reactant containing at least one polyetherpolyol having a molecular weight of from about 500 to about 18,000 and having hydroxyl and/or primary amino groups,
   A3) optionally aliphatic amines,
   A4) one or more reinforcing agents,
   A5) optionally at least one of catalysts and additives, and
   A6) at least one metal salt chosen from compounds produced from
      i) the metals Li, Mg, Ca, Ba, Zn, Cu, Fe, Co and Ni, and
      ii) carboxylic acids having 8 to 40 C atoms, phosphorus-containing acids having 8 to 40 C atoms or sulfur-containing acids having 8 to 40 C atoms,
   with a prepolymer component B produced from
   B1) a polyisocyanate component consisting of a liquefied polyisocyanate or polyisocyanate mixture of the diphenylmethane series, and
   B2) a polyol component having an average molecular weight of from about 500 to about 18,000 containing at least one polyetherpolyol optionally containing organic fillers,
   wherein components A2) and B2) each independently have a functionality of 2 to 8, an ethylene oxide content of 40-100 wt. % and an alkyloxirane content of 0-60 wt. %, component A and component B reacted in stoichiometric proportions such that the isocyanate index of the elastomer ranges from about 80 to about 120 and wherein polyol component B2) introduced via component B comprises from about 10 to about 90 mol % of the urethane content.

7. The process according to claim 6, further including a step of after baking the reinforced polyurethane-urea elastomer for about 45 minutes at about 160° C.

8. The reinforced polyurethane-urea elastomer according to claim 7, wherein the elastomer has an after-baking surface tension of greater than about 40 mN/m.

9. The reinforced polyurethane-urea elastomer made by the process according to claim 6.

10. A polyurethane molding made from the reinforced polyurethane-urea elastomer according to claim 9.

11. In a process for the production of a lacquered component for the vehicle industry, the improvement comprising including the polyurethane molding according to claim 9.

12. The process according to claim 11, wherein the lacquered component is chosen from flexible car mud flaps, car doors, car rear flaps and car wings.

* * * * *